(12) United States Patent
Zhu et al.

(10) Patent No.: US 9,137,226 B2
(45) Date of Patent: Sep. 15, 2015

(54) AUTHENTICATION METHOD AND AUTHENTICATION DEVICE FOR PERFORMING GROUP AUTHENTICATION USING A GROUP KEY

(75) Inventors: Hongru Zhu, Beijing (CN); Minpeng Qi, Beijing (CN); Wenjuan Jiao, Beijing (CN)

(73) Assignee: CHINA MOBILE COMMUNICATIONS CORPORATION, Beijing (CN)

( * ) Notice: Subject to any disclaimer, the term of this patent is extended or adjusted under 35 U.S.C. 154(b) by 227 days.

(21) Appl. No.: 13/643,958

(22) PCT Filed: Apr. 27, 2011

(86) PCT No.: PCT/CN2011/073352
§ 371 (c)(1),
(2), (4) Date: Oct. 26, 2012

(87) PCT Pub. No.: WO2011/134395
PCT Pub. Date: Nov. 3, 2011

(65) Prior Publication Data
US 2013/0046983 A1    Feb. 21, 2013

(30) Foreign Application Priority Data
Apr. 27, 2010   (CN) .......................... 2010 1 0161805

(51) Int. Cl.
*H04L 9/32*    (2006.01)
*H04L 29/06*   (2006.01)
*H04W 12/06*   (2009.01)
(Continued)

(52) U.S. Cl.
CPC .............. *H04L 63/065* (2013.01); *H04L 9/085* (2013.01); *H04W 12/06* (2013.01); *H04L 9/0833* (2013.01); *H04L 63/0884* (2013.01); *H04W 4/005* (2013.01)

(58) Field of Classification Search
None
See application file for complete search history.

(56) References Cited

U.S. PATENT DOCUMENTS 7,194,628 B1    3/2007   Guthery
7,930,756 B1 *  4/2011   Crocker et al. ................. 726/27
(Continued)

FOREIGN PATENT DOCUMENTS

CN    1801696 A       7/2006
CN    101379758 A     3/2009

OTHER PUBLICATIONS

Zhang et al., "A Cluster-Based Group Key Management Scheme for Wireless Sensor Networks", Apr. 6-8, 2010, IEEE, pp. 386-388.*
(Continued)

*Primary Examiner* — Lisa Lewis
*Assistant Examiner* — Henry Tsang
(74) *Attorney, Agent, or Firm* — Harness, Dickey & Pierce, P.L.C.

(57) ABSTRACT

An authentication method and device, authentication centre and system are provided. The method comprises: receiving at least one access request and obtaining sub-key information from the access request; generating a group key according to the obtained sub-key information, and interacting with the network side according to the group key to perform the group authentication. The solution can solve the problem that the one-to-one authentication causes network load in the present art, implement the authentication of multiple nodes at one time, reduce network resources and the network load of the server, and can be appropriate for the authentication of the terminal nodes in the internet of things, and can greatly improve the availability of services in the internet of things.

3 Claims, 4 Drawing Sheets (51) Int. Cl.
*H04L 9/08* (2006.01)
*H04W 4/00* (2009.01)

(56) References Cited

U.S. PATENT DOCUMENTS

| | | | |
|---|---|---|---|
| 2003/0185396 A1* | 10/2003 | Asano et al. | 380/277 |
| 2003/0235309 A1 | 12/2003 | Struik et al. | |
| 2006/0075248 A1* | 4/2006 | Westhoff et al. | 713/178 |
| 2008/0083022 A1* | 4/2008 | Lee et al. | 726/5 |
| 2008/0162927 A1* | 7/2008 | Wang et al. | 713/155 |
| 2010/0268943 A1* | 10/2010 | Roy-Chowdhury et al. | 713/156 |

OTHER PUBLICATIONS

China Mobile. M2M Group Authentication [online] Apr. 16, 2010 Internet<url:http://3gpp.org/ftp/tsg_sa/WG3_Security/TSGS3_59_Lisbon/Docs/S3-100466.zip>, pp. 5-7 (in English).

Zhao Zhiping et al., "Cluster-based Group Key Management Scheme for Sensor Networks", Computer Engineering, Mar. 15, 2008, vol. 34, No. 5; pp. 153-154, Section 3.1 (with English Abstract).

International Search Report for PCT/CN2011/073352, (in Chinese and English), mailed Aug. 4, 2011; ISA/CN.

"Cluster-based Group Key Management Scheme for Sensor Networks", Zhao, Zhipping et al., Computer Engineering, vol. 34, No. 5, pp. 153-154, 157.

"M2M Group Authentication", China Mobile, {Internet<URL:HTTP://3gpp.org/ftp/tsg-sa/WG3_SecurityTSG3_59_Lisbon/Docs/S3-100466.zip.}, pp. 5-7.

Chinese Search Report dated May 22, 2013.

Office Action from Chinese priority Application No. 201010161805.6 issued by The State Intellectual Property Office (SIPO) dated May 30, 2013. Partial English Translation provided by Unitalen Attorneys at Law.

* cited by examiner

AUTHENTICATION METHOD AND AUTHENTICATION DEVICE FOR PERFORMING GROUP AUTHENTICATION USING A GROUP KEY

FIELD OF THE INVENTION

This application is a National Stage application of PCT international application PCT/CN2011/073352, filed on Apr. 27, 2011 which claims the priority of Chinese Patent Application No. 201010161805.6, entitled "AUTHENTICATION METHOD AND DEVICE, AUTHENTICATION CENTRE AND SYSTEM", filed with the Chinese Patent Office on Apr. 27, 2010, which is incorporated by reference in its entirety.

The present invention relates to network security technology in the communication field, and in particular to authentication method and device, authentication centre and system.

BACKGROUND OF THE INVENTION

Most of the existing communication network authentication mechanisms employ a one-to-one and two-way authentication mode, including a single key based Authentication and Key Agreement (AKA) authentication mechanism and a public key based certificate authentication mechanism.

Figure 1:
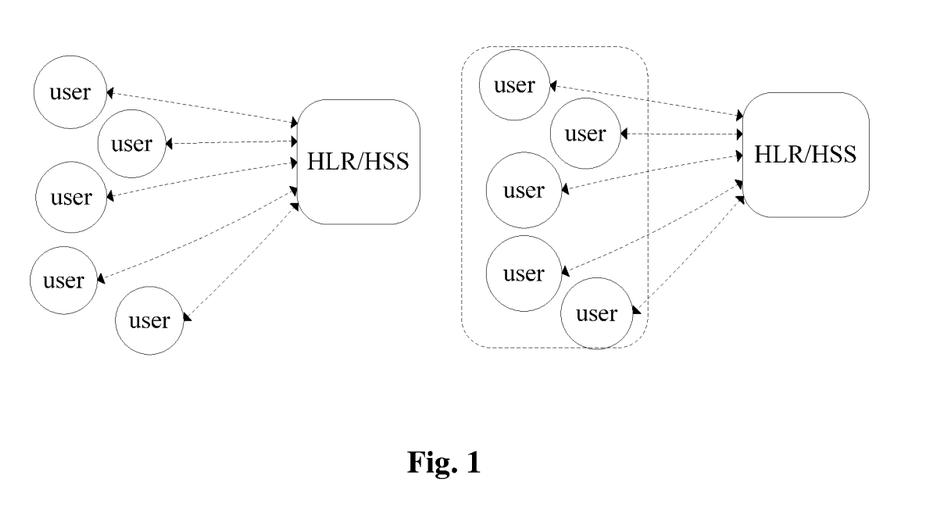
FIG. 1 is a schematic view of a network authentication mode in the prior art.

As shown in FIG. 1, the single key authentication mechanism includes: storing a shared key K both in a user node and a corresponding home server HLR/HSS (Home Location Register/Home Subscriber Server) node, and performing an interactive authentication with the corresponding home server node when the user accesses the network. The left part of FIG. 1 is a schematic view showing that users who are independent of each other perform authentications respectively, and the right part of FIG. 1 is a schematic view showing that a group of users who are associated with each other perform authentications respectively. The network side can only determine the identity of the user node which performs the interactive authentication after the authentication is passed, no matter whether there is an association relationship between the users.

The public key based certificate authentication mechanism includes: each of the user and the corresponding home server node may acquire its corresponding identity certificate and corresponding private key from a trusted third party Certificate Authority (CA) and may acquire a CA certificate for verifying the identity certificate of the other party; the user and the corresponding home sever verify each other's identity by sending their respective identity certificates when the user accesses the network; the user who possesses the valid certificate can access the network after the authentication is passed.

In conceiving the present invention, the inventor finds out that signaling interaction required by large numbers of user authentications will consume network resources and server's computing resources if there are large numbers of terminal nodes. Specifically, all of the existing authentications employ the one-to-one mode, and when there are large numbers of terminal nodes which have a same behavioral characteristic in the network, these terminal nodes sometimes need to access the network simultaneously, in this case, large numbers of network resources will be occupied, the network load will be increased and more server's computing resources will be consumed by large numbers of user authentications. As a result, the existing authentication mode is not appropriate for internet of things and may degrade the availability of services of the internet of things

SUMMARY OF THE INVENTION

A first object of the present invention is to provide an authentication method to achieve one-time authentication to multiple nodes.

A second object of the present invention is to provide an authentication device to achieve one-time authentication to multiple nodes.

A third object of the present invention is to provide an authentication centre in a network side to achieve one-time authentication to multiple nodes.

A fourth object of the present invention is to provide an authentication system to achieve one-time authentication to multiple nodes.

In order to achieve the first object mentioned above, an authentication method is provided according to an aspect of the present invention, including: receiving at least one access request and acquiring sub-key information from the received access request; generating a group key according to the acquired sub-key information; and interacting with a network side according to the group key to perform a group authentication.

After the step of receiving the at least one access request, the method may further include: generating a group authentication request which includes group information according to prestored identification information of the group; and sending the group authentication request which includes the group information to the network side.

Interacting with the network side according to the group key to perform the group authentication may include: receiving a feedback message of the group authentication request from the network side; and generating a group authentication response to be sent to the network side according to the feedback message and the group key.

Preferably, sending node information of the access request to the network side when the group authentication is passed. The network side performs validity verification on the node information according to prestored identification information of the group and the node in the group. The identification information of the node may include: an ID of the node, or the ID of the node and the corresponding sub-key information.

Preferably, generating the group key may include: selecting t pieces of the sub-key information from all of the acquired sub-key information and locally stored sub-key information to generate the group key, where t is less than or equal to a total number n of the nodes in the group.

Preferably, the method may further include: marking the node corresponding to the sub-key information selected for generating the group key; adding the marking information into the node information to be sent to the network side.

In order to achieve the first object mentioned above, an authentication method is further provided according to an aspect of the present invention, including:

storing group information and corresponding group key information on a network side; and performing a group authentication of a terminal side according to the group key information.

Preferably, performing the group authentication of the terminal side according to the group key information specifically includes:

receiving a group authentication request which includes the group information from the terminal side by the network side;

searching for the corresponding group key information according to the group authentication request, generating a feedback message and sending the feedback message to the terminal side; and receiving a group authentication response from the terminal side, and verifying the group authentication response according to the group key.

Preferably, after the verification of the group authentication response according to the group key is passed, the method further includes:

receiving node information sent from the terminal side;

performing validity verification on the node information according to prestored identification information of the group and the node in the group;

the identification information of the node includes: an ID of the node, or the ID of the node and the corresponding sub-key information;

the node information includes: the ID of the node and marking information, or the ID of the node, the corresponding sub-key information and the marking information, the marking information is information obtained by marking, by the terminal side, the node corresponding to the sub-key information selected for generating the group key.

In order to the achieve the second object mentioned above, an authentication device is provided according to another aspect of the present invention, including: an interface module adapted for receiving at least one access request; a key generation module adapted for acquiring sub-key information from the received access request and generating a group key according to the acquired sub-key information; and a group authentication module adapted for interacting with a network side according to the group key to perform a group authentication.

The device may further include a storage module adapted for storing identification information of the group; the group authentication module may be further adapted for generating a group authentication request which includes group information according to the access request and the identification information of the group and sending the group authentication request to the network side.

Preferably, the storage module may further store identification information of a node in the group, the device may further include a judging module adapted for rejecting or deleting the access request when it is confirmed that the node which sends the access request is a node outside the group according to the identification information of the node in the group.

The group authentication module may include: a request sub-unit adapted for generating the group authentication request and receiving a feedback message of the group authentication request from the network side; and a response sub-unit adapted for generating an authentication response to be sent to the network side according to the feedback message and the group key.

The key generation module may include: a key recovery sub-module adapted for selecting t pieces of the sub-key information from the acquired sub-key information and locally stored sub-key information, where t is less than or equal to a total number n of the terminal nodes in the group.

The key generation module may further include: a marking sub-module adapted for marking the node corresponding to the key information selected for generating the group key and adding the marking information into the node information to be sent to the network side; the node information may include: an ID of the node, or the ID of the node and the corresponding sub-key information, or the ID of the node and the marking information; or the ID of the node, the corresponding sub-key information and the marking information.

In order to achieve the third object mentioned above, an authentication centre in a network side is provided according to another aspect of the present invention, including: a storage module adapted for storing group information and corresponding group key information; a group authentication module adapted for performing a group authentication of the terminal side according to the group key information.

The group authentication module may include: an interface sub-module adapted for receiving a group authentication request of the terminal side, sending a feedback message and receiving a group authentication response of the terminal side; and an authentication sub-module adapted for searching for the corresponding group key information according to the group authentication request, generating the feedback message and verifying the group authentication response according to the group key.

The storage module may further adapted for storing identification information of the node in the group, and the interface sub-module may further be adapted for receiving node information sent from the terminal side, the authentication sub-module may further include: a query sub-unit adapted for searching the storage module for the corresponding group key according to the group information included in the group authentication request; a calculation sub-unit adapted for generating the feedback message of the group authentication request according to the group key information; and a verification sub-unit adapted for verifying the group authentication response of the terminal side according to the group key and verifying validity of the node information according to the identification information of the node in the group, the identification information of the node may include: an ID of the node, or the ID of the node and the corresponding sub-key information, the node information may include: the ID of the node, or the ID of the node and the corresponding sub-key information, or the ID of the node and the marking information, or the ID of the node, the corresponding sub-key information and the marking information, the marking information is information acquired by marking, by the terminal side, the node corresponding to the sub-key information selected for generating the group key.

In order to achieve the fourth object mentioned above, an authentication system is provided according to another aspect of the present invention, including: a terminal node adapted for sending an access request which includes sub-key information;

a representative node adapted for receiving an access request from at least one terminal node and acquiring sub-key information; generating a group key according to the sub-key information; and performing a group authentication with a network side according to the group key; and an authentication centre adapted for storing group information and corresponding group key information, and performing the group authentication of the representative node according to the group key information.

According to the authentication method and device, authentication centre and system of the internet of things communication of embodiments of the present invention, multiple nodes of the terminal side can be authenticated at a time since interaction with the network side can be performed by one node (representative node) in a group authentication mode, therefore, the problem of network resource consumption and the technical defect of server network load occurred when large numbers of nodes are simultaneously authenticated in a one-to-one authentication mode in the prior art are solved. According to the present invention, the node information in the access request received by the node (representative node) may be further sent to the network side after the group authentication is passed, therefore, group interactive authentication may be achieved, which can be applied in the authentication of the terminal node in the internet of things and can improve the availability of services of the internet of things greatly.

The present invention further provides an authentication mechanism used in a case that a group of nodes as a whole accesses a network outside of the whole. The mechanism guarantees logic relevance among nodes in a group and solves the defect in the prior art that the logic relevance between the nodes in the network and the external network is broken up due to the one-to-one authentication.

According to the present invention, the group key may be recovered by several keys with the number being less than the total number of the nodes in the group, so that technical defect that a fault of one member of the group fails access of other nodes in the group may be avoided. According to the present invention, after the authentication is accomplished, the network side may further verify the validity of the node not participated in the key recovery, and further verify the authenticity of the access node.

Other features and advantages of the present invention will be described in the description later and will be partly apparent from the description, or will be understood by referring to embodiments of the present invention. The objects and other advantages of the present invention may be implemented and obtained by structures pointed out specifically in the description, claims and drawings.

The technical solution of the present invention will be further described in detail below in conjunction with the drawings and the embodiments.

BRIEF DESCRIPTION OF THE DRAWINGS

The drawings, which constitute part of the description, are used to provide further understanding of the present invention, and to explain the present invention together with the embodiments of the present invention, the drawings do not limit the present invention, in which.

DETAILED DESCRIPTION OF THE INVENTION

Preferable embodiments of the present invention will be explained below in conjunction with the drawings by taking a node authentication in internet of things as an example. It should be understood that the preferable embodiments described herein are only used for illustrating and explaining the present invention and not used for limiting the present invention.

The First Embodiment

Figure 2:
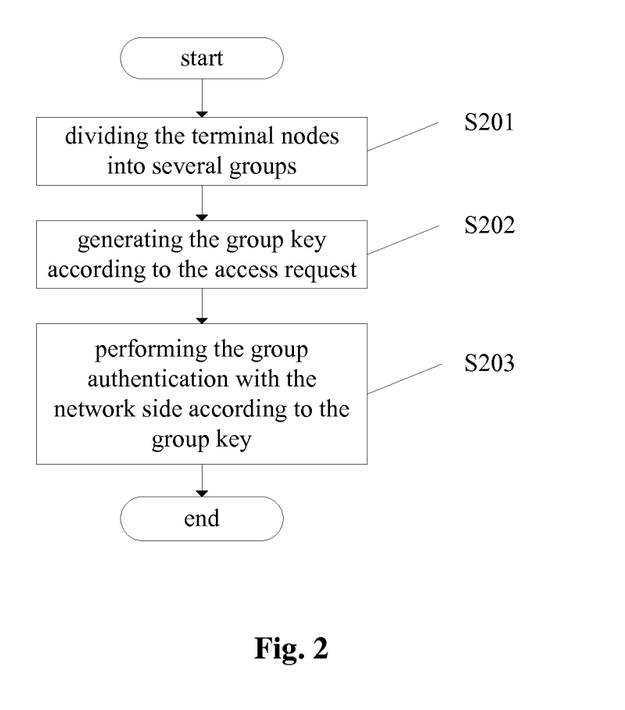
FIG. 2 is a flow chart of an authentication method according to a first embodiment of the present invention.

FIG. 2 is a flow chart of an authentication method according to the first embodiment of the present invention. As shown in FIG. 2, the present embodiment includes the following steps.

Step S201: selecting terminal nodes having a same behavioral characteristic/behavioral ability in the internet of things to form a group by a network side in advance, specifically, for example, selecting monitor apparatuses having shooting and capture characteristics to form a group; and storing information of different groups, such as information of the group, nodes in the group, and a group key used by the group for performing an authentication, where the group key may be equivalent to a shared key stored both in a terminal node and a network side in the prior art, and at least one representative node may be designated in each group.

Step S202: receiving an access request including a sub-key from at least one terminal node and generating a group key according to the sub-key, by the representative node in the group.

Specifically, generating the group key according to the sub-key may include:

the representative node may acquire at least one sub-key from the received at least one access request and generate the group key according to the at least one sub-key;

the representative node may acquire at least one sub-key from the received at least one access request, and then the representative node has at least two sub-keys including a locally stored sub-key of the representative node itself, and then the representative node may generate the group key according to the at least two sub-keys;

the representative node may acquire multiple sub-keys from multiple access requests when receiving multiple access requests sent respectively from multiple terminal nodes, and may generate the group key according to the acquired multiple sub-keys, where the representative node may use or not use the locally stored sub-key of the representative node itself in generating the group key.

In the present embodiment, the representative node performs the subsequent authentication procedure with the network side after receiving the access request sent from the at least one terminal node, thereby achieving authentications of at least two terminal nodes, including the terminal node which sends the access request and the representative node itself, by the process of the one-time authentication procedure.

Step S203: performing the group authentication with the network side according to the group key by the representative node in the group. Specifically, the group authentication procedure may be started after access requests sent from at least a set number of terminal nodes are received; or the group authentication procedure may be started after a set period of time since the first access request is received according to all of the access requests received during the set period of time.

In the authentication process, the network side obtains the group key according to the stored group information and performs the subsequent authentication (for example, vector authentication, response authentication) with the representative node of the terminal side. In a case that the verification of the representative node by the network side is not passed, the network side notifies the representative node of the result that the verification is not passed, and in a case that the authentication of the representative node with the network side is passed, the representative node sends information of each node participated in the group authentication to the network side, so that the network side may determine which nodes can access the network according to the node information.

The present embodiment has the following advantages. Multiple nodes can be authenticated by one-time authentication and interaction with the network side, thereby avoiding the problem of network resource consumption occurred when the existing communication network authentication mechanism performs authentication in the future large-scale network. When being applied in the internet of things, the authentication method may be appropriate for the authentication of the terminal nodes in the internee of things and may greatly improve the availability of services of the internet of things. The existing network authentication of sensors and the like is only an authentication inside the sensor network, however, the group authentication method proposed by the present embodiment is an authentication solution in which a group of nodes as a whole is accessed to a network outside the whole, which guarantees the logic relevance among the nodes in the group and solves the defect in the prior art that the logic relevance between the nodes inside the network and the external network is broken up due to the one-to-one authentication.

Figure 3:
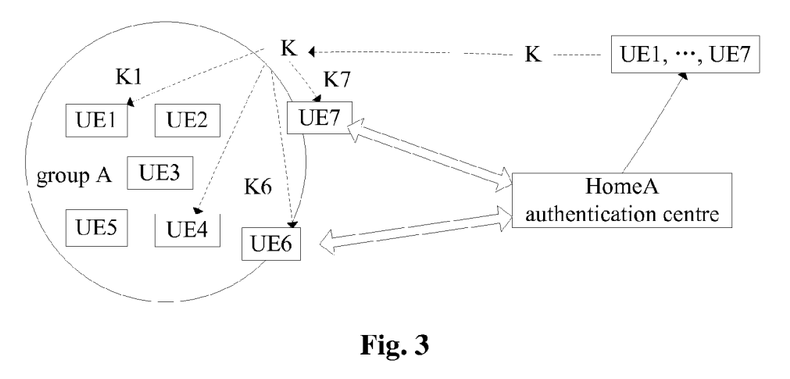
FIG. 3 is a schematic structure view of an authentication system according to the first embodiment of the present invention.

FIG. 3 is a schematic structure view of an authentication system according to the first embodiment of the present invention. The system shown in FIG. 3 includes the following parts.

An authentication centre of the network side, such as a home location register HomeA, which stores a group A identification, node identification in the group A (ID information of UE1-UE7) and a group key $K_A$, the authentication centre may further store information related to the group, such as ID information of the representative node of the group A, in an specific implementation, these information may be stored in a form of an ID list in the authentication centre, see Table 1 below for details:

TABLE 1 group information stored in the authentication centre of the network side

| group | group key | node identification in the group | representative node | remarks |
|---|---|---|---|---|
| group A identification | $K_A$ | (ID1, K1), (ID2, K2), ... (ID7, K7), or ID1, ID2, ... ID7 | ID6, ID7 | representative node is optional, group key and node identification are necessary |
| group B identification | $K_B$ | (ID8, K8), (ID9, K9), ... (ID12, K12), or ID8, ID9, ... ID12 | ID10, ID11 | |
| ... | ... | ... | ... | ... |

The group A consists of UE1, UE2, ..., UE7, where UE6 and UE7 are the representative nodes in the group, and UE1, ..., UE5 are the terminal nodes, which may include:

a storage module for storing sub-key information and information of at least one representative node it belongs to, such as UE6, UE7;

a request module for selecting one representative node from information of the representative nodes and sending an access request to the selected representative node.

The authentication method of the present invention will be exemplified by the schematic view of FIG. 3 below.

1) The group key $K_A$ is shared by the group A and the home node HomeA, the HomeA divides the $K_A$ into seven sub-keys K1, K2, ... K7 by utilizing a threshold mechanism algorithm such as an Asmuth-Bloom threshold scheme, and distributes the sub-keys to all of the nodes UE1, UE2, ... UE7 in the group A in a predistribution manner for respective storage.

2) all of the nodes UE1, UE2, ... UE7 in the group A can communicate with each other through a private protocol, but the node having strong terminal ability, such as a sensor gateway or a Machine to Machine (M2M) terminal, is selected as the representative node to perform the group authentication. For example, in the present embodiment, only UE6 or UE7 has the function of network access authentication and may be used as the representative node (also referred as an authentication node). There may be multiple representative nodes in the group, and one of the representative nodes is selected according to the group condition and the private protocol, to perform the network access authentication on behalf of the whole group.

3) All of the nodes send the access requests to the representative node during the authentication. For example, the UE1 ... UE7 send their sub-key shares and the corresponding IDs, such as (ID1, K1), (ID2, K2), ... (ID7, K7), to the representative node, and the representative node composes the group key $K_A$ by using the threshold mechanism, the representative node can recover the group key $K_A$ as long as t (t<7, t may be set according to specific condition of the network) or more sub-keys are acquired. Therefore, the problem that the whole group is unavailable due to unavailability of certain node in the group is avoided.

4) According to conditions such as physical environment in the group and utilization ratio of the nodes, following certain principle such as a rotation principle or a load balance principle and by a private protocol communication, the group A selects UE6 or UE7 as the authentication node to perform the network access authentication on behalf of the whole group, where the representative node may add the group A identification or the ID of the representative node itself into the group authentication request, so as to facilitate the network side to query the corresponding group key information and generate an authentication vector for subsequent authentication.

It should be understood by the skilled in the art that according to the present embodiment, terminal nodes having a same behavioral characteristic/behavioral ability in the internet of things may be selected to form a group, and the node having strong terminal ability in the group is selected as the representative authentication node to perform the group authentication. The group information of the group, the group key K, the identity information of the users in the group and the like are stored in the authentication centre of the core network side. The group key K is divided into several sub-keys which are stored respectively in the terminal nodes in the group, and the group key K can be recovered by the sub-keys with a number being greater than or equal to t less than n (n is a total number of the nodes in the group), which guarantees that the group key information can be recovered from the nodes in the group and thus the representative node may perform the interactive authentication with the authentication centre of the core network side on behalf of all the member nodes in the group, and also avoids the problem that other members in the group can not access the network since one member in the group can not access the network due to damage, outage and so on or one member in the group is unwilling to access the network.

The Second Embodiment

Figure 4:
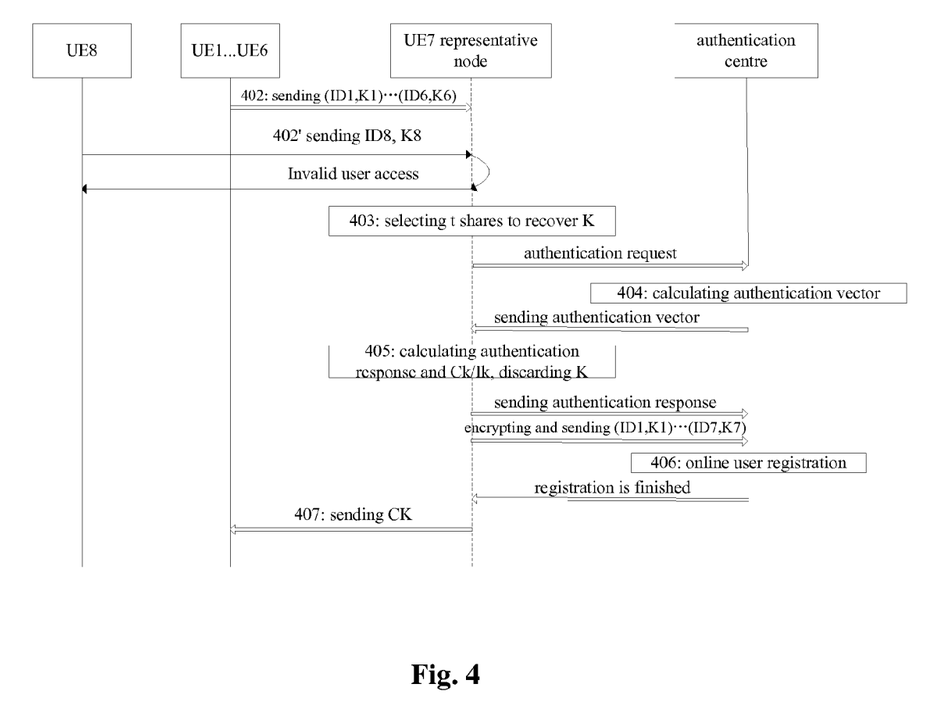
FIG. 4 is a flow chart of an authentication method according to a second embodiment of the present invention.

FIG. 4 is a flow chart of an authentication method according to the second embodiment of the present invention. The authentication process according to the present embodiment can be understood by referring to FIG. 3.

Step 401: constructing a structured logic hierarchy such as a tree structure of the $UE_1$, $UE_2$, ..., $UE_7$ according to a private protocol such as a minimum spanning tree protocol, where the $UE_7$ is the root of the tree, and the $UE_1$, $UE_2$, ..., $UE_7$ are in a same group.

Step 402: the $UE_1$, ..., $UE_6$ send their IDs and sub-keys $(ID_1, K_1)$, $(ID_2, K_2)$, $(ID_6, K_6)$ to the $UE_7$ by utilizing the tree structure.

A $UE_8$ sends its ID and sub-key $(ID_8, K_8)$ to the $UE_7$, the $UE_7$ determines that the $UE_8$ is not the node in the group according to the stored identification information of the nodes in the group, and thus directly returns a refuse response such as "invalid user access".

Step 403: the $UE_7$ calculates the group key $K_A$ by using a recovery key algorithm in the threshold mechanism according to any t sub-keys selected from the received six sub-keys and a local sub-key (totally seven sub-keys). By taking an AKA algorithm as an example, the following procedure of the group authentication based on the shared group key $K_A$ will be described below in detail. In other embodiments, the group authentication may be performed by using other authentication algorithms based on the group key $K_A$.

a) When the group A performs the authentication with the authentication centre $Home_A$ of the network side, the $UE_7$ initiates an authentication request to the $Home_A$, where the authentication request includes the group identification information of the group A, and the group identification information may particularly be the ID information of the representative node.

b) The $UE_7$ records the node ID of the received sub-key, marks the sub-keys and the IDs thereof used for generating the group key $K_A$, and sends the information to the core network side for online user registration after the AKA authentication is accomplished.

Step 404: after receiving the group authentication request from the representative node, the $Home_A$ finds out the corresponding group key $K_A$ according to the group identification information or the ID information of the representative node included in the group authentication request, calculates a Cryptographic Key (CK)/Integrated Key (IK) and an authentication vector, and sends the authentication vector to the $UE_7$ as a feedback message.

Step 405: the $UE_7$ authenticates the network side based on the group key $K_A$ and the information included in the received authentication vector, calculates a corresponding authentication response according to the authentication vector and the group key $K_A$, and sends the corresponding authentication response to the $Home_A$, the $Home_A$ authenticates the group A based on the group key $K_A$ and the information included in the received authentication response, and the $UE_7$ also needs to calculate the corresponding CK/IK according to the authentication vector. For security, the $UE_7$ should discard the $K_A$ immediately after the calculation is finished.

If the representative node $UE_7$ doesn't receive a message indicating the authentication is not passed from the network side in a predetermined time, it shows that the group authentication is passed. The $UE_7$ encrypts all of the IDs of the nodes and the sub-key information used for the group authentication by using the cryptographic key CK and transmits the encrypted node information to the $Home_A$ for registration. The transmitted node information is used by the network side for verifying the identity of the node. Preferably, the node information may include the ID of the node and the sub-key, and may also include the marking information in the step 403 b) for further verification performed by the network side subsequently.

Step 406: the $Home_A$ performs the online user registration, specifically, after the authentication of the group A based on the group key $K_A$ and the information included in the received authentication response is passed, the $Home_A$ performs the online user registration according to the received node information sent from the $UE_7$ and notifies the $UE_7$ after the registration is accomplished. In the present embodiment, the group A, the identification information of the nodes in the group A (the IDs of the UE1-UE7, or the IDs of the UE1-UE7 and the corresponding sub-key information) and the group key $K_A$ are stored in the $Home_A$, details are shown in Table 1.

The $Home_A$ verifies the validity of the marked node according to the mark and further verifies the validity of the unmarked node. Specifically, for the unmarked node information, such as the ID of the node, or the ID of the node and its corresponding sub-key information, the $home_A$ may compare the node information with its stored node identifications to determine whether the ID of the node or the sub-key information is consistent, so as to verify the validity of the node. Specifically, performing the verification according to the content of the node information and the identification information of the node stored on the network side includes the following implementations.

1. If the node information only includes the node ID information, the node ID may be compared directly with the node IDs of the node identifications in the group stored in the $Home_A$, to judge whether the node ID in the node information is stored in the node identifications in the group, so that the validity verification is implemented.

2. If the node information also includes the sub-key information and does not include the marking information, the node ID and the sub-key in the node information may be compared with the node identifications in the group stored in the $Home_A$ such as $(ID1, K1), (ID2, K2), ... (ID7, K7)$, so that the validity verification is implemented.

3. If the node information also includes the node ID as well as the marking information, only the unmarked node information is verified, for example, only the node ID, or only the node ID and the corresponding sub-key is verified. Specifically, the validity verification corresponding to the first implementation or the second implementation above is performed according to the content of the node information.

Step 407: the $UE_7$ sends the cryptographic key CK to the $UE_1$, ... $UE_6$, so that the $UE_1$, ... $UE_7$ may encrypt and transmit the user data by using the CK.

According to the present embodiment, the authentication centre HomeA which manages the keys divides the group key $K_A$ of the group A into n portions, and stores the ID of the node in the group and the corresponding key shares in the identity information of the uses in the group, that is, the identification information of the node includes the ID information and the sub-key information. When performing the access network authentication, the terminal nodes in the group transmit their respective sub-keys to the representative node of the group authentication, then the representative node selects t pieces of key information from the n pieces of key information according to the threshold mechanism algorithm to recover the group key and sends the group key to the core network side for authentication.

As shown in FIG. 4, since the node outside the group has no corresponding sub-key, the group key K cannot be obtained, and thus the network cannot be accessed by the group authentication; meanwhile, since the particularity of the threshold mechanism algorithm and the limitation of the parameter selection herein, the authentication cannot be passed if more than n-t keys are lost, so that the network side may confirm that at least t valid nodes are included in the group authentication when receiving a valid group authentication request. After the single key authentication is finished, the representative node transmits all of the received node IDs and key information to the authentication centre, and then the authentication centre records the information and uses the information to verify the identity information of all nodes participated in the authentication and the validity of the nodes in the group which do not participate in the key recovery. According to the present embodiment, the resource consumption occurred when large numbers of nodes perform authentications simultaneously may be decreased and the logic relevance among the nodes may be maintained.

The Third Embodiment

Figure 5:
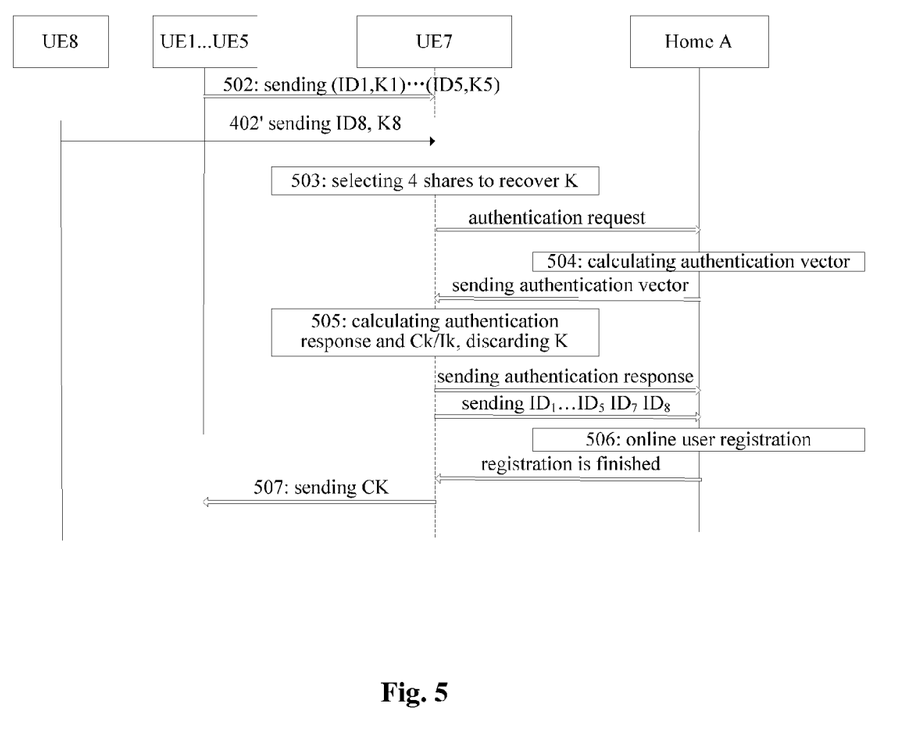
FIG. 5 is a flow chart of an authentication method according to a third embodiment of the present invention.

FIG. 5 is a flow chart of an authentication method according to the third embodiment of the present invention. The authentication method of the third embodiment is similar to the authentication method of the second embodiment shown in FIG. 4, and the process particularly includes the following steps.

Step 501: constructing a structured logic hierarchy such as a tree structure of the $UE_1$, $UE_2$ . . . $UE_7$ according to a protocol such as a minimum spanning tree protocol, where the $UE_7$ is the root of the tree, and the $UE_1$, $UE_2$, . . . , $UE_7$ are in a same group.

Step 502: the $UE_1$, . . . , $UE_5$ sends their IDs and the sub-keys $(ID_1, K_1)$, $(ID_2, K_2)$, . . . , $(ID_5, K_5)$ to the $UE_7$ by utilizing the tree structure; furthermore, a node $UE_8$ outside the group sends its ID and sub-key $(ID_8, K_8)$ to the $UE_7$.

Step 503: the $UE_7$ selects four sub-keys from the received six sub-keys and the sub-key $K_7$ stored in the $UE_7$ itself, and calculates the group key $K_A$ according to a recovery key algorithm in the threshold mechanism. By taking an AKA algorithm as an example, the following procedure of the group authentication based on the shared group key $K_A$ will be described below in detail. In other embodiments, the group authentication may be performed by using other authentication algorithms based on the group key $K_A$.

a) When the group A performs the authentication with the authentication centre $Home_A$ of the network side, the $UE_7$ initiates a group authentication request to the $Home_A$, where the group authentication request includes the group identification information of the group A, and the group identification information may particularly be the ID information of the representative node.

b) The $UE_7$ records the member ID of the received sub-key, marks the node ID used for recovering the group key $K_A$ and sends the information to the core network side for online user registration after the AKA authentication is finished.

Step 504: after receiving the authentication request from the authentication representative node, the $Home_A$ finds out the corresponding group key $K_A$ according to the group information such as the group identification information or the ID information of the representative node included in the group authentication request. Since the group key is generated by the $UE_7$ by selecting four shares from $UE_1$, . . . , $UE_5$, $UE_7$ and $UE_8$, there are two cases for the group key generated by the $UE_7$:

① the $UE_8$ is not selected for generating the group key, and the group key is generated by any four shares selected from the $UE_1$, . . . , $UE_5$ and $UE_7$. Therefore, the group key is correct. The $Home_A$ calculates the Cryptographic key CK/integrated key IK and the authentication vector and sends the authentication vector to the $UE_7$ as the feedback message, then step 505 is performed;

② the sub-key of the $UE_8$ is selected for generating the group key, therefore, the group key is not consistent with the group key stored on the network side. In this case, the $Home_A$ sends the authentication vector to the $UE_7$ as the feedback message, then step 505 is performed, where the authentication response sent in the step 505 will be an error, and therefore the process will end up with a failure of the authentication of the network side in step 506.

Step 505: the $UE_7$ authenticates the network side based on the group key $K_A$ and the information included in the received authentication vector, calculates the corresponding group authentication response according to the authentication vector and the group key, and sends the group authentication response to the $Home_A$; the $Home_A$ authenticates the group A based on the group key $K_A$ and the information included in the received authentication response, and the $UE_7$ also needs to calculate the corresponding CK/IK according to the authentication vector. In order to ensure security, the $UE_7$ should discard the $K_A$ immediately after the calculation is finished.

The $UE_7$ encrypts the node ID of the received key information by utilizing the Cryptographic key CK, and transmits the encrypted node ID information to the $Home_A$ for registration, the transmitted node information is used for verifying the identity of the node by the network side.

Step 506: the $Home_A$ verifies the group authentication response, that is, the $Home_A$ authenticates the group A based on the group key $K_A$ and the information included in the received authentication response. If the verification fails, the $Home_A$ will send a verification failure message to the $UE_7$ and the authentication ends. If the group authentication is passed, the $Home_A$ will perform the online user registration on the node information sent from the representative node. Specifically, performing verification according to the content of the node information and the identification information of the node stored on the network side includes the following implementations.

1. If the node information only includes the node ID information, the node ID may be compared directly with the node IDs of the node identifications in the group stored in the $Home_A$, to judge whether the node ID in the node information is stored in the node identifications in the group, thereby the validity verification is implemented.

2. If the node information also includes the sub-key information and does not include the marking information, the node ID and the sub-key in the node information may be compared with the node identifications in the group stored in the $Home_A$ such as (ID1, K1), (ID2, K2), . . . (ID7, K7), thereby the validity verification is implemented.

3. If the node information also includes the node ID as well as the marking information, only the unmarked node information is verified, for example, only the node ID or only the node ID and corresponding sub-key is verified. Specifically, the validity verification corresponding to the first implementation or the second implementation above is performed according to the content of the node information.

According to the present embodiment, even if the group key generated in the step 504 is correct and the group authentication is passed, the $UE_8$ is verified to be an invalid user in this validity verification step, therefore the registrations of other users are accomplished and the UE7 is notified.

Step 507: the $UE_7$ sends the cryptographic key CK to the $UE_1$, . . . , $UE_5$, so that the $UE_1$, . . . , $UE_5$ and the $UE_7$ may encrypt and transmit the user data by using the CK.

It can be seen from the above embodiment that the validity of the group authentication is guaranteed. For the access of the node outside the group, the method shown in FIG. 4 may be used, in which the access is rejected directly by the representative node, or the method shown in FIG. 5 may be used, in which the validity of the access node is verified in the authentication centre subsequently, and after the authentication is finished, the validity of the node which doesn't participate in the group key recovery is further verified, therefore, reliability and accuracy of the group authentication are guaranteed and "fake" access of other node outside the group is avoided.

The Fourth Embodiment

Figure 6:
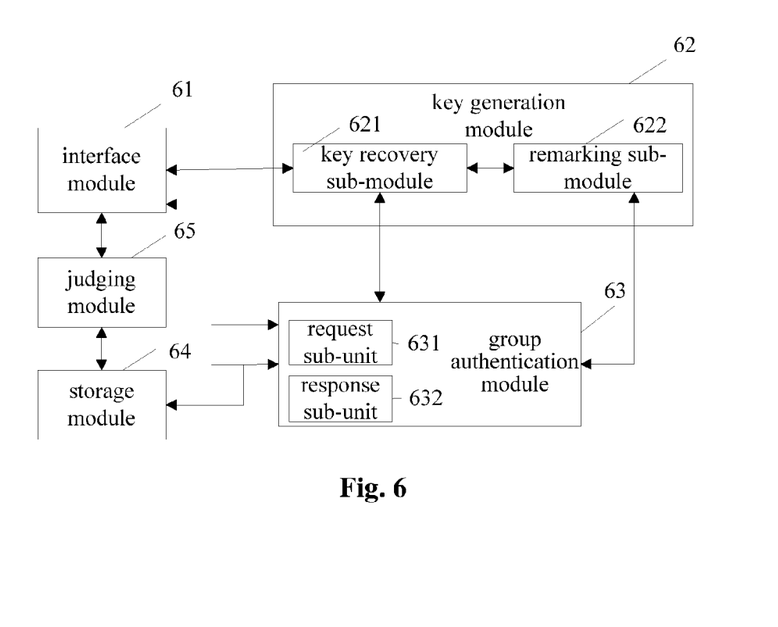
FIG. 6 is a schematic structure view of an authentication device according to a fourth embodiment of the present invention.

FIG. 6 is a schematic structure view of an authentication device according to the fourth embodiment of the present invention. The device may locate in a representative node of a group in the internet of things, such as the representative node UE7 shown in FIGS. 3 to 5. As shown in FIG. 6, the device includes:

an interface module 61 for receiving an access request of at least one terminal node;

a key generation module 62 for acquiring sub-key information from the received access request and generating a group key according to the acquired sub-key information;

a group authentication module 63 for interacting with a network side according to the group key to perform a group authentication.

The device may further include a storage module 61 for storing group identification information; the group authentication module may also be used for generating a group authentication request which includes group information according to the access request and the group identification information and sending the group authentication request to the network side. The group authentication module 63 may further send the node information of the access request to the network side when the group authentication is passed.

The group authentication module 63 may include:

a request sub-unit 631 for sending the group authentication request including the group information or its ID information, which can be stored by the storage module as shown in Table 2 below, and receiving a feedback message (for example, an authentication vector) of the group authentication request from the network side;

a response sub-unit 632 for generating an authentication response to be sent to the network side according to the feedback message and the group key, for example, for calculating the corresponding group authentication response according to the group key when receiving the authentication vector of the group authentication request from the network side via the interface module, and sending the corresponding group authentication response to the network side. For security, the response sub-unit 632 may further delete the group key after the group authentication response calculation is accomplished.

The key generation module 62 may include: a key recovery sub-module 621 for selecting t pieces of the sub-key information from the sub-key information included in the received access request and the sub-key information stored in the key recovery sub-module itself to generate the group key, where t is less than or equal to a total number n of terminal nodes in the group.

The key generation module 62 may further include a marking sub-module 622 for marking the node that corresponds to the key information selected for generating the group key, and adding the marking information into the node information to be sent to the network side; the node information includes: node ID information, or the node ID information and the corresponding marking information.

The storage module 64 of the device may further store the identification information of the node in the group; and the device further includes a judging module 65 for rejecting or deleting the access request when it is confirmed that the node which sends the access request is a node outside the group according to the identification information of the node in the group. Specifically, an implement of the storage is shown in Table 2 below:

TABLE 2

| group information stored in the representative node of the terminal side ||||
|---|---|---|---|
| group | node identification in the group | information of representative node itself | remarks |
| group A identification | ID1, ID2, ..., ID6 | ID7, K7 | the node identification in the group is optional, the group A identification and the information of itself is necessary |
| ... | ... | ... | ... |

If only the group identification information is stored in the storage module, the access request of the node outside the group is not directly rejected, as the embodiment of the method shown in FIG. 5; if the node identification in the group is also stored in the storage module as shown in Table 2, the access request is judged directly according to the node ID, to discard/reject the access of the node outside the group directly and only accept the access request of the node in the group to perform the group authentication, as shown in FIG. 4.

The Fifth Embodiment

Figure 7:
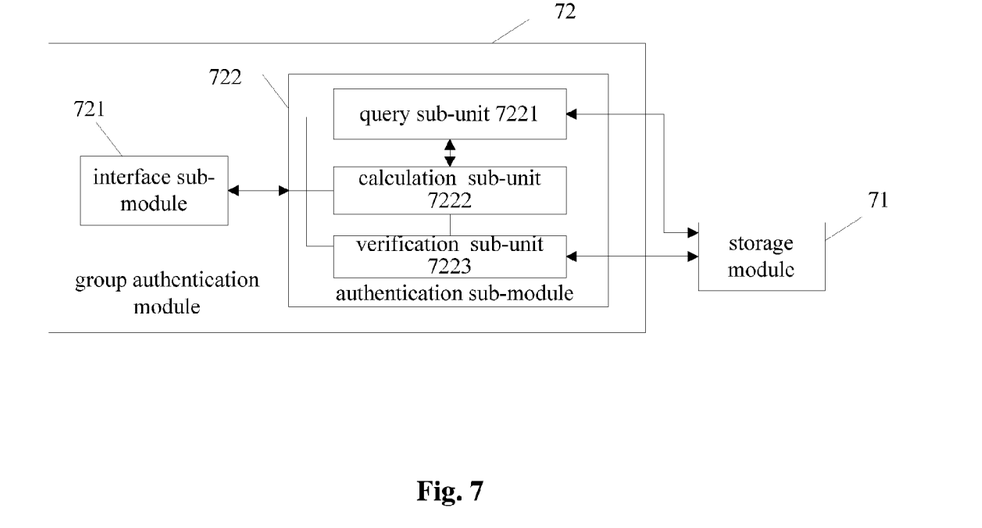
FIG. 7 is a schematic structure view of an authentication centre according to a fifth embodiment of the present invention.

FIG. 7 is a schematic structure view of an authentication centre of the fourth embodiment of the present invention. The centre may locate at the Home Location Register (HLR), the Home Subscriber Server (HSS), such as the authentication centre HomeA shown in FIGS. 3 to 5. As shown in FIG. 7, the authentication centre includes:

a storage module 71 for storing group information (group identification), group key information and identification information of nodes in the group; the module may further store ID of the representative node corresponding to the group information, as shown in Table 1, and search for the corresponding group and group key according to the group authentication request;

a group authentication module 72 for performing the group authentication of the terminal side according to the group key information.

The group authentication module 72 may include:

an interface sub-module 721 for receiving the group authentication request of the terminal side, sending a feedback message of the group authentication request (for example, the authentication vector) and receiving the group authentication response, the node information and the like of the terminal side; an authentication sub-module 722 for searching for the corresponding group key information according to the group information included in the group authentication request, and generating a authentication vector feedback message of the group authentication request; and verifying the group authentication response according to the group key, the authentication sub-module 722 may further verify the validity of the node information if the identification information of the node in the group is stored in the storage module 71, for example, verifying the group authentication response according to the group key, verifying the validity of the node information according to the identification information of the node, and verifying the validity of the node without the marking information according to the identification information of the node in the storage module.

A specific authentication interaction process is shown by referring to the authentication of the HomeA shown in FIGS. 2 to 5. The authentication sub-module 722 may include:

a query sub-unit 7221 for searching the storage module for the corresponding group key information according to the group information included in the group authentication request;

a calculation sub-unit 7222 for calculating the feedback message such as the group authentication vector according to the group key and sending the feedback message to the terminal side;

a verification sub-unit 7223 for verifying the group authentication response of the terminal side according to the group key, and verifying the validity of the node information according to the identification information of the node in the group, the details are shown in FIGS. 4 to 5.

The respective embodiments of the methods of the invention above may be implemented in devices having the structures shown in the structure views of FIGS. 6 to 7.

It will be appreciated by the skilled in the art that all or part of the steps of the above method embodiments may be implemented by relevant hardware instructed by programs. The foregoing programs may be stored in a computer-readable storage medium, and steps including the above method embodiments are performed when the program is executed. The foregoing storage medium may include various mediums which can store program codes, such as a ROM, a RAM, a magnetic disc or an optical disc.

It should be noted that the above are only preferable embodiments of the present invention, and should not be used to limit the present invention. Although the present invention is described in detail by referring to the foregoing embodiments, modifications to the technical solution described in the foregoing embodiments or equivalent substitutes of some technical features thereof may be made by the skilled in the art. Any modification, equivalent substitute and improvement made within the spirit and principle of the present invention should be included in the protection scope of the present invention.

What is claimed is:

1. An authentication method for performing group authentication using a group key, comprising:
   receiving, by a user equipment, at least one access request and acquiring sub-key information from the access request; and
   generating, by the user equipment, a group key according to the acquired sub-key information,
   wherein the generating the group key comprises:
      selecting, by the user equipment, t pieces of the sub-key information from all of the acquired sub-key information and locally stored sub-key information to generate the group key, wherein t is less than or equal to a total number n of nodes in the group;
      marking, by the user equipment, the node corresponding to the sub-key information selected for generating the group key; and
      interacting, by the user equipment, with a network according to the group key to perform a group authentication,
   wherein the interacting with a network according to the group key to perform a group authentication comprises:
      receiving, by the user equipment, a feedback message of a group authentication request from the network;
      generating, by the user equipment, a group authentication response to be sent to the network according to the feedback message and the group key;
      sending, by the user equipment, node information of the access request to the network if the group authentication is passed, wherein the node information includes marking information; and
      performing a validity verification on the node information by the network according to prestored identification information of the group and the node in the group, wherein:
         the identification information of the node comprises: an ID of the node and the corresponding sub-key information; and
         the node information comprises: the ID of the node, the corresponding sub-key information, and the marking information.

2. An authentication method performing group authentication using a group key, comprising:
   storing, by a home subscriber server, group information and corresponding group key information in a network; and
   performing, by the home subscriber server, a group authentication of a user equipment according to the group key information,
   wherein the performing the group authentication of the user equipment according to the group key information comprises:
      receiving a group authentication request which includes the group information from the user equipment by the network;
      searching for the corresponding group key information according to the group authentication request, generating a feedback message, and sending the feedback message to the user equipment; and
      receiving a group authentication response of the user equipment, and verifying the group authentication response according to the group key; and
   wherein after the verification of the group authentication response according to the group key is passed, the method further comprises:
      receiving node information sent from the user equipment; and
      performing a validity verification on the node information according to prestored identification information of the group and a node in the group, wherein:
         the identification information of the node comprises: an ID of the node and corresponding sub-key information; and
         the node information comprises: the ID of the node, the corresponding sub-key information and marking information, wherein the marking information is information obtained by marking the node which corresponds to the sub-key information selected for generating the group key by the user equipment.

3. An authentication device performing group authentication using a group key, comprising:
   a processor and a memory, wherein the memory comprises:
      an interface program configured to receive at least one access request;
      a key generation program configured to acquire sub-key information from the received access request, and generate a group key according to the acquired sub-key information; and
      a group authentication program configured to interact with a network according to the group key to perform a group authentication, wherein the group authentication program comprises:

a request program configured to generate a group authentication request and receive a feedback message of the group authentication request from the network; and a response program configured to generate a group authentication response to be sent to the network according to the feedback message and the group key;

wherein the key generation program comprises:

a key recovery program configured to select t pieces of the sub-key information from all of the acquired sub-key information and locally stored sub-key information to generate the group key, wherein t is less than or equal to a total number n of terminal nodes in the group; and a marking program configured to mark the node corresponding to the sub-key information selected for generating the group key, and add marking information into node information to be sent to the network if the group authentication is passed, wherein the node information comprises: an ID of the node, the corresponding sub-key information and the marking information.

* * * * *